April 20, 1926.
W. C. ANTHONY ET AL
SHOVEL FRAME
Filed June 27, 1925 2 Sheets-Sheet 1
1,581,153
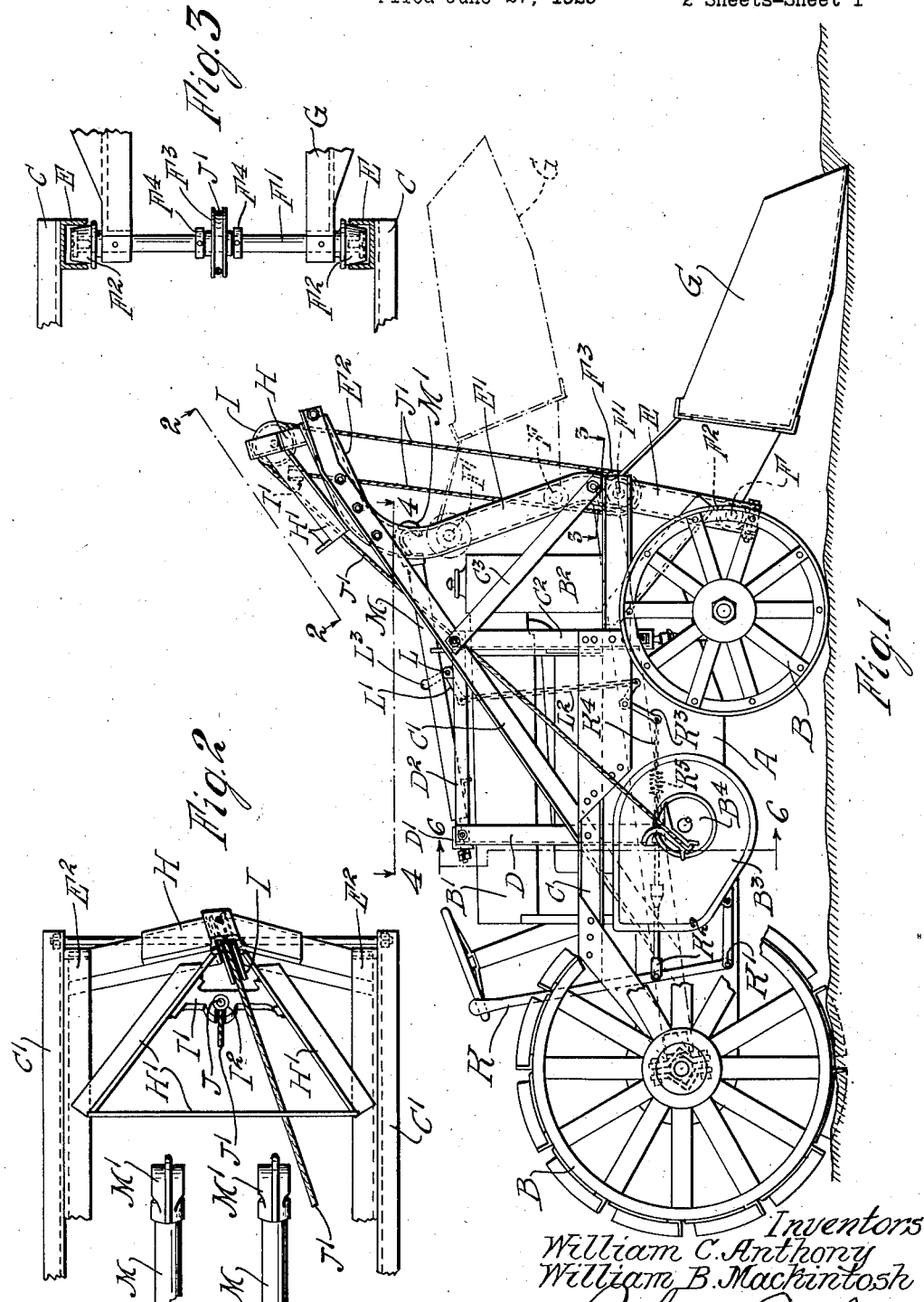

April 20, 1926.
W. C. ANTHONY ET AL
1,581,153
SHOVEL FRAME
Filed June 27, 1925    2 Sheets-Sheet 2
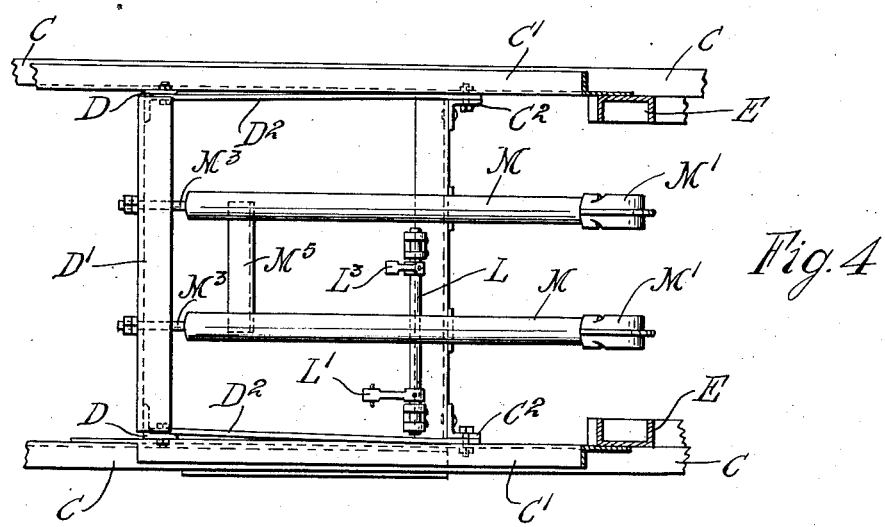
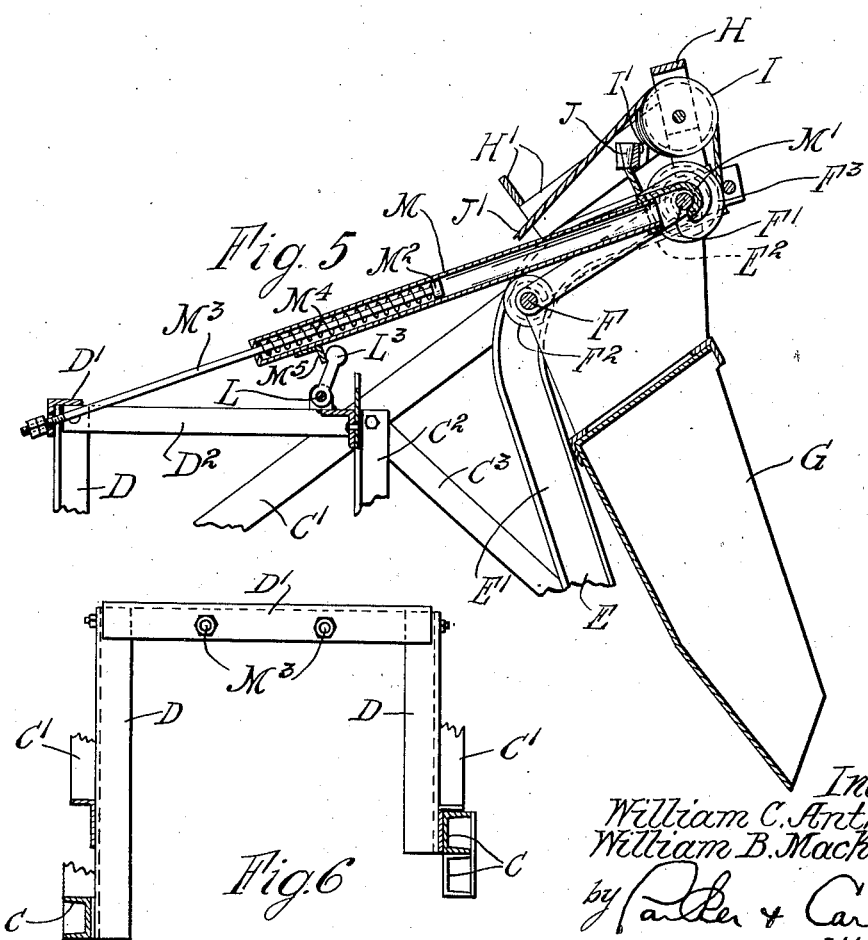
Inventors
William C. Anthony
William B. Mackintosh
by Parker & Carter,
Attorneys.

Patented Apr. 20, 1926.

1,581,153

UNITED STATES PATENT OFFICE.

WILLIAM C. ANTHONY AND WILLIAM B. MACKINTOSH, OF STREATOR, ILLINOIS, ASSIGNORS TO ANTHONY COMPANY, OF STREATOR, ILLINOIS, A CORPORATION OF ILLINOIS.

SHOVEL FRAME.

Application filed June 27, 1925. Serial No. 39,879.

*To all whom it may concern:*

Be it known that we, WILLIAM C. ANTHONY and WILLIAM B. MACKINTOSH, being citizens of the United States, and residents of Streator, in the county of La Salle and State of Illinois, have invented a certain new and useful Improvement in Shovel Frames, of which the following is a specification.

This invention relates to an elevating shovel and has for one object to provide a shovel designed primarily for lifting material and moving it, where the purpose is not so much a high lift as a comparatively low lift. The shovel is therefore intended primarily for moving material from piles and piling it again rather than for raising it from a low position to a higher position. Another object is to provide a mechanism which may be used as a digging shovel in the manner that horse drawn scoops are at present used. Other objects will appear from time to time throughout the specification and claims.

Our invention is illustrated more or less diagrammatically in the accompanying drawings wherein:

Figure 1 is a side elevation with parts broken away;

Figure 2 is a plan view taken on line 2—2 of Figure 1;

Figure 3 is a horizontal detailed cross section taken on line 3—3 of Figure 1;

Figure 4 is a section taken on line 4—4 of Figure 1;

Figure 5 is a longitudinal cross section on an enlarged scale showing the bucket in the dump position;

Figure 6 is a section taken on line 6—6 of Figure 1, illustrating a part of the supporting frame.

Like parts are indicated by like characters throughout.

The shovel is mounted on a tractor the details of which form no part of the present invention. The tractor is provided with a body A, wheels B, B, fuel tank $B^1$, radiator $B^2$, and a hoisting gear transmission housing $B^3$ provided with a pulley $B^4$.

Mounted on the tractor is a shovel frame which is formed with longitudinal members C C. One of them is preferably built-up as shown in Figure 1 the other is made of a single piece. These details are not essential to the present invention. The frame includes inclined side members $C^1$ and vertical bracing members $C^2$ and additional bracing members $C^3$. Extending vertically from the side frame members C, adjacent the center of the tractor is a bridge structure formed of vertical members D D and the cross member $D^1$. This bridge structure is braced from the side members $C^1$ by means of the generally horizontal members $D^2$.

Supported on the members C and $C^1$ is a track formed of channels E. At its bottom the track is provided with a straight portion inclined slightly rearwardly from the vertical. Above this it is provided with an oppositely inclined portion $E^1$ and above that it is bent forwardly and upwardly as at $E^2$.

Mounted to run along the track is a dolly provided with axles F $F^1$ and flanged wheels $F^2$ adapted to run within the channel of the track. The upper axle $F^1$ of the dolly has mounted upon it a sheave $F^3$ which is mounted to rotate about the axle and provided with spacing collars $F^4$ $F^4$ which hold it against lateral movement along the axle.

Extending forwardly from the dolly and attached to it is a scoop shovel G. It is provided with sides and bottom but is open on front and top.

Joining the members $C^1$ at their tops and also the track members E is a bridge construction H. Mounted in the bridge H is a sheave I. Mounted between the members $H^1$ is a short bridge member $I^1$ which is provided with a socket $I^2$ adapted to receive the enlarged end J of the hoisting cable $J^1$. The other end of the cable is fastened to the spool $B^4$. The cable is thus fastened at one end to the socket at the top of the structure and passes downward about the sheave on the upper axle of the dolly and then upward about the sheave at the top of the structure and then downward to the driving spool.

K is a hand lever pivoted on the link $K^1$ and attached to a controlling rod $K^2$, which by its movement backward and forward controls the operation of the hoisting mechanism $B^3$. $K^3$ is a bell crank pivoted on a suitable part of the side member C. It is attached by means of the chain $K^4$ to the controlling rod $K^2$. It is provided with a spring connection K⁵ which serves to cushion shocks and jars in the operation.

L is a shaft mounted on the supporting structure and provided at one end with a lever arm L¹ which is connected by means of a rod or chain L² with one arm of the bell crank K³. L³ is a second lever arm on the shaft L adjacent its inner end. It is positioned substantially centrally with respect to the structure.

M M are cylinders provided each at one end with a hook member M¹, each having within it a piston M² and a piston rod M³ which is fastened at its lower outer end to the cross member D¹. M⁴ is a compression spring within the cylinder M bearing at one end upon its closed lower end and at the other upon the piston M². These springs tend to resist movement of the cylinder from the position shown in Figures 1 and 4. The cylinders are joined together by means of a cross member M⁵.

Although we have shown an operative device, still it will be obvious that many changes might be made in size, shape and arrangement of parts without departing materially from the spirit of our invention; and we wish, therefore, that our showing be taken as in a sense diagrammatic.

The use and operation of our invention are as follows:

When the shovel is to be raised, the engine is started, the operating handle is moved so as to throw the hoisting gear into operation and the cable is wound in about the spool, thus raising the shovel. As the shovel first rises above the straight bottom portion of the track, it comes upon the oppositely inclined intermediate or middle portion of the track. It is then tilted into the position shown in dotted lines in Figure 1. As it moves farther upward, its position is somewhat reversed until it finally reaches the extreme position shown in Figure 5, which is the extreme dumping position.

As the shovel moves upward beyond the position shown in dotted lines in Figure 1, the hook members engage the upper axle of the dolly, and the springs in the cylinders are compressed, thereafter by the upward movement of the shovel.

When the cylinders have been drawn forward and upward almost to the position shown in Figure 5, the cross member joining them contacts the lever arm L³ and rotates to the position shown in Figure 5, and through this movement the chain L² is drawn up, the bell crank L³ rotated, the chain K moved laterally, and the hoisting gear reversed or thrown out of operation. The bucket is thereupon free to move downward. This it does under the influence of gravity and assisted by the influence of the springs which are now free to expand and do so, drawing the cylinders down again toward the position shown in Figure 1. The spring cylinders thus serve the dual purpose of operating the automatic throw-out which automatically stops the hoisting of the shovel after it has reached a given point, and they also serve to initiate and accelerate the downward movement of the shovel, thus causing it to move downward more rapidly, once it is free to do so. They serve the further purpose of cushioning the final upward movement of the shovel.

When material is to be raised from a pile, the shovel is lowered to a position so that its forward lip is substantially on a level with the ground surface, the tractor is then driven forward and the shovel is forced into the pile of material and filled. The shovel is then raised to the position shown in dotted lines in Figure 1. The tractor is then moved to the point where the material is to be deposited and the shovel is then moved upward to the position shown in Figure 5 and the material deposited.

When the shovel is to be used not merely for moving material but for shovelling, that is actually for digging a hole, it is lowered until its forward lip rests upon the ground and the shovel is then driven forward. Since the shovel is free to move slightly lower than this, and since its bottom is at an angle to the surface of the ground, it is forced downward into the ground and thus digs. When the shovel has been filled by this movement, it is raised in the manner above described, the tractor is moved to the point where the material is to be deposited, and discharge takes place as above described. The discharge of material raised by the shovel may, of course, be made onto the ground or a level surface or into a receptacle.

We claim:

1. In combination with a tractor, a shovel assembly mounted thereon, said assembly including tracks and a shovel adapted to be moved thereon, the tracks formed into three zones, the lowest being inclined forwardly and the intermediate section being inclined rearwardly, and the upper section being inclined forwardly, whereby the shovel when it is wholly on the lower section is inclined downwardly and forwardly, when it is wholly on the intermediate section is inclined downwardly and rearwardly, and when it stands on the upper section is inclined forwardly and downwardly.

2. In combination with a tractor, a shovel assembly mounted thereon, said assembly including tracks and a shovel adapted to be moved thereon, the tracks formed into three zones, the lowest being inclined forwardly and the intermediate section being inclined rearwardly, and the upper section being inclined forwardly at a greater inclination than the first section, whereby the shovel when it is wholly on the lower section is inclined downwardly and forwardly, when it is wholly on the intermediate section is inclined downwardly and rearwardly, and when it stands on the upper section is inclined forwardly and downwardly.

3. In combination with a tractor, a shovel assembly mounted thereon, said assembly including tracks and a shovel adapted to be moved thereon, the tracks formed into three zones, the lowest being inclined forwardly, the intermediate section being inclined rearwardly, and the upper section being inclined forwardly, whereby the shovel when it is wholly on the lower section is inclined downwardly and forwardly, when it is wholly on the intermediate section is inclined downwardly and rearwardly, and when it stands on the upper section is inclined forwardly and downwardly to a degree sufficient to dump its contents.

4. In combination with a tractor, a shovel assembly mounted thereon, said assembly including tracks and a shovel adapted to be moved thereon, the tracks formed into three zones, the lowest being inclined forwardly, the intermediate section being inclined rearwardly, and the upper section being inclined forwardly at a greater inclination than the first section, whereby the shovel when it is wholly on the lower section is inclined downwardly and forwardly, when it is wholly on the intermediate section is inclined downwardly and rearwardly, and when it stands on the upper section is inclined forwardly and downwardly to a degree sufficient to dump its contents.

5. In combination with a tractor a shovel assembly mounted thereon, a shovel adapted to be moved along said assembly to be used in shovelling, carrying and dumping a load, means for moving the bucket to be filled and subsequently moving it to retain its load, including tracks formed in three zones, the lowest being inclined forwardly the intermediate section being inclined rearwardly, and the upper section being inclined forwardly whereby the shovel when it is wholly on the lower section is inclined downwardly and forwardly, when it is wholly on the intermediate section is inclined downwardly and rearwardly, and when it stands on the upper section is inclined forwardly and downwardly.

6. In combination with a tractor, a shovel assembly mounted thereon, a shovel adapted to be moved along said assembly to be used in shovelling, carrying and dumping a load, means for moving the shovel to be filled and subsequently moving it to retain its load, including tracks formed in three zones, the lowest being inclined forwardly and the intermediate section being inclined rearwardly, and the upper section being inclined forwardly at a greater inclination than the first section, whereby the shovel when it is wholly on the lower section is inclined downwardly and forwardly, when it is wholly on the intermediate section is inclined downwardly and rearwardly, and when it stands on the upper section is inclined forwardly and downwardly.

7. In combination with a tractor a shovel assembly mounted thereon, a shovel adapted to be moved along said assembly to be used in shovelling, carrying and dumping a load, means for moving the bucket to be filled and subsequently moving it to retain its load, including tracks formed in three zones, the lowest being inclined forwardly, the intermediate section being inclined rearwardly, and the upper section being inclined forwardly, whereby the shovel when it is wholly on the lower section is inclined downwardly and forwardly, when it is wholly on the intermediate section is inclined downwardly and rearwardly, and when it stands on the upper section is inclined forwardly and downwardly to a degree sufficient to dump its contents.

8. In combination with a tractor a shovel assembly mounted thereon and including a track and a shovel adapted to move therealong, the track adjacent its lower end being inclined forwardly from the vertical, and above such portion being inclined rearwardly from the vertical, whereby the shovel when it is on the lower portion is inclined downwardly and forwardly and when it is on the intermediate portion is inclined downwardly and rearwardly, the track having an upper portion adapted to reverse the shovel again and dump it when the shovel is moved thereon.

9. In combination with a shovel, a track along which said shovel is raised and lowered, a hoisting mechanism, a controlling means therefor, in combination with means for operating the latter and for initiating the downward movement of the shovel, said means including a spring cylinder terminating at one end in a hook adapted to engage a part of the shovel as the same is raised and to move with it and thereby to compress the spring, the spring cylinder carrying a part adapted to contact a part of the controlling mechanism as the shovel moves upward and to operate it to control the hoisting mechanism.

10. In combination with a shovel, a track along which said shovel is raised and lowered, a hoisting mechanism, a controlling means therefor, in combination with means for operating the latter automatically, and for initiating the downward movement of the shovel, said means including a spring cylinder terminating at one end in a hook adapted to engage a part of the shovel as the same is raised and to move with it and thereby to compress the spring, the spring cylinder carrying a part adapted to contact a part of the controlling mechanism as the shovel moves upward and to operate it to control the hoisting mechanism.

11. In combination with a shovel, a track along which said shovel is raised and lowered, a hoisting mechanism a controlling means therefor, in combination with means for operating the latter automatically, and for initiating the downward movement of the shovel, said means including a pair of spring cylinders terminating at one end in a hook adapted to engage a part of the shovel as the same is raised and to move with it and thereby to compress the spring, the spring cylinders carrying a part adapted to contact a part of the controlling mechanism as the shovel moves upward and to operate it to control the hoisting mechanism.

12. In combination with a shovel, a track along which said shovel is raised and lowered, a hoisting mechanism, a controlling means therefor, in combination with means for operating the latter, and for initiating the downward movement of the shovel, said means including a pair of spring cylinders terminating at one end in a hook adapted to engage a part of the shovel as the same is raised and to move with it and thereby to compress the spring, the spring cylinders carrying a part adapted to contact a part of the controlling mechanism as the shovel moves upward and to operate it to control the hoisting mechanism.

13. In combination with a shovel, a track along which said shovel is raised and lowered and a hoisting mechanism and controlling means therefor, in combination with means for yieldingly resisting the hoisting movement of the shovel, said means including two relatively movable parts engaging a spring, said parts mounted for pivotal movement together in response to the movement of said shovel, one of said parts adapted to engage a part of the shovel as the same is raised and to move with it, the spring adapted yieldingly to resist such movement and to initiate the downward movement of the shovel.

14. In combination with a shovel, a track along which said shovel is raised and lowered and a hoisting mechanism and controlling means therefor, in combination with means for yieldingly resisting the hoisting movement of the shovel, said means including pairs of relatively movable members, each engaging a spring, said parts mounted for pivotal movement together in response to the movement of said shovel, one of each of said pairs of parts carrying a member adapted to engage a part of the shovel as the same is raised and to move with it, the spring adapted yieldingly to resist such movement and to initiate the downward movement of the shovel.

15. In combination with a shovel, a track along which said shovel is raised and lowered and a hoisting mechanism and controlling means therefor, in combination with means for yieldingly resisting the hoisting movement of the shovel, said means including two relatively movable parts engaging a spring, one of said parts adapted to engage a part of the shovel as the same is raised and to move with it, the spring adapted yieldingly to resist such movement and to initiate the downward movement of the shovel, one of said parts adapted to engage in its movement a part of the controlling mechanism as the shovel moves upward and to operate it to control the hoisting mechanism.

Signed at Streator, county of La Salle, and State of Illinois, this 23 day of June 1925.

WILLIAM C. ANTHONY.
WILLIAM B. MACKINTOSH.